United States Patent [19]
Davies

[11] 3,780,777
[45] Dec. 25, 1973

[54] DEFECTING SAW
[75] Inventor: John R. Davies, Grand Rapids, Mich.
[73] Assignee: Oliver Machinery Company, Grand Rapids, Mich.
[22] Filed: Oct. 6, 1971
[21] Appl. No.: 186,897

[52] U.S. Cl. .................. 144/3 N, 83/371, 83/365
[51] Int. Cl. .................................................. B27b 5/02
[58] Field of Search ...................... 143/46 F, 46 R; 144/2 R, 3 N, 3 R; 225/96.5; 83/371, 33, 35, 209, 210, 360, 365, 370

[56] References Cited
UNITED STATES PATENTS
| | | | |
|---|---|---|---|
| 2,652,864 | 9/1953 | DeAnguera | 143/46 F |
| 3,341,010 | 9/1967 | Switzer | 225/96.5 UX |
| 3,044,508 | 7/1962 | Sherman | 143/46 F |
| 3,063,479 | 11/1962 | Prentice | 143/46 F |

*Primary Examiner*—Donald R. Schran
*Attorney*—Price et al.

[57] ABSTRACT

A defecting saw including a feed conveyor and a transversely movable rotating saw, both of which are controlled by means of a control circuit including a light detector for detecting fluorescent marks placed on a board to identify a defect area. An ultraviolet light source is mounted adjacent the saw blade together with the light detector such that, as a board is fed into the saw blade area by the feed conveyor, the detector will detect light from the illuminated fluorescent mark. The light detector is coupled to the control circuit which operates to stop the feed conveyor and simultaneously swing the rotating saw transversely across the board at the fluorescent mark. After a cut is made, the feed conveyor again starts until the next fluorescent mark is detected. Defects are thereby automatically cut away from the board when they are marked on either side by such fluorescent marks.

6 Claims, 4 Drawing Figures

DEFECTING SAW

BACKGROUND OF THE INVENTION

The present invention relates to a defecting saw for automatically cutting a board at a predetermined marked position by detecting reflected light from a marked position to control the saw.

In some sawmill applications whereby relatively high quality lumber is to be sorted and shipped, it is necessary to remove defects such as knots, checks, or other imperfections in the board. This can be done manually by an operator who simply cuts the defects out using a manually operated saw. A preferable method of removing defects however is to employ an automatically operated saw known as a defecting saw which detects marks placed on a board adjacent a defect and automatically responds to the position indication mark to make a cut in front of and behind the defeat thereby cutting away that portion of a board.

Several apparatuses have been employed in such an automatically operated defecting saw. U.S. Pat. No. Re. 25,686 reissued to C. A. Sherman on Nov. 17, 1964, describes one method whereby an operator visually inspects the board for defects and places a conductive mark of graphite material on either side of the defect, thereby enclosing the defect within the boundries of the marks. The associated defecting saw has a plurality of conductive fingers separated from one another which come into contact with the board. When a mark is contacted by these strips the fingers are electrically coupled to one another through the graphite conduction path. The fingers are coupled to a circuit which develops an electrical signal to automatically operate a rotary saw when the fingers are electrically shorted. A disadvantage with this type of system resides in the fact that both electrical and physical contact must be made between the detection fingers and the actual board as it travels along a conveyor. Thus the contacts are subject to bouncing over a graphite mark due to an irregular surface area of the board. Other cutting errors may occur where due to prolonged use, the contact fingers short out due to an accumulation of graphite between them. The fingers also may require periodic readjustment and replacement as they become worn due to the frictional contact between them and the relatively fast moving boards passing through the saw. The shortcomings of this type of system as well as other systems employing physical contact between a detector and some type of marks on the board to be defected, are overcome by the optical detection system of the present invention.

SUMMARY OF THE INVENTION

The saw of the present invention employs an ultraviolet light source which illuminates a board as it travels into the area of the rotating defecting saw. An operator places fluorescent marks on opposite sides of defects on a board by means of a fluorescent marker prior to placing the board, which may include any number of defects, onto the defecting saw feed conveyor. A photo detector responds only to light radiated from the fluorescent marks in response to its excitation by the ultraviolet light source. The detector thereby produces a control signal which causes a conveyor to stop while simultaneously causing the rotating saw to swing transversely across the board, cuttting it at the marked position. As the saw returns to its original home position the feed conveyor is restarted and the board continues on until the next fluorescent mark indicating a boundary point on a defect is reached, at which time the cutting cycle is repeated. Since there is no contact between the detection means and the actual board, there are no parts which will wear due to frictional contact between the detection means and the rapidly traveling boards. By using fluorescent markers and an ultraviolet light source, only the marked areas will become excited and radiate light which can be detected by optical detection means, the photo transistor placed adjacent the light source and positioned to detect only light from the fluorescent mark on a board. Thus, the machine can operate under any normal ambient light conditions without adversely affecting its automatic defecting operation.

It is an object therefore of the present invention to provide an improved automatically operable saw which employs an optical detection system for detecting marks on a board at predetermined locations and for controlling the operation of a saw such that defects bounded by such marks will be cut away from the board.

It is an additional object of the present invention to provide an automatically operated defecting saw which employs an ultraviolet light source to illuminate a board as it travels towards a saw blade and an adjacent optical transistor to detect fluorescent marks placed on the board and which are responsive to the ultraviolet light such that they emit light which can be detected by the optical detector.

It is finally an object of the present invention to provide an improved defecting saw which requires no physical or electrical contact between a moving board being fed into the saw area and the detection means employed to detect predetermined marked positions on the board.

Defecting saws embodying the present invention include a source of light for illuminating a board as it is fed into the saw blade area by a feed conveyor. Light detection means adjacent the saw blade are adapted to detect predetermined marks placed on the boards and couple control signals developed in response thereto to a control circuit. The control circuit operates to stop the feed conveyor and move the saw blade across the marked position to cut the board at that location.

DETAILED DESCRIPTION OF THE PREFERRED EMBODIMENT

Figure 1:
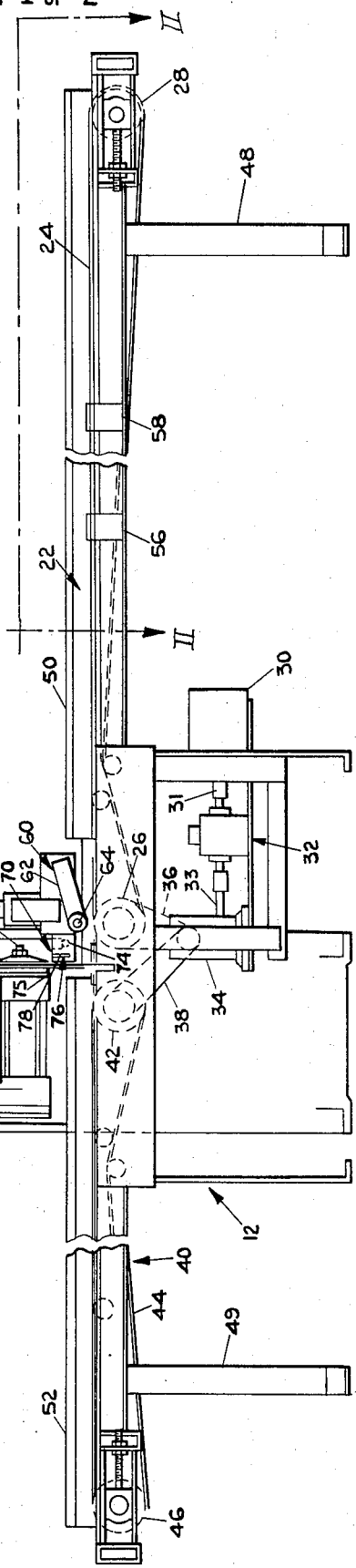
FIG. 1 is a front elevation view of the defecting saw embodying the present invention.

Referring now in detail to FIG. 1 there is shown a saw assembly 10 mounted on a table 12. The saw assembly includes a rotary saw having a disc blade 14 coupled to a shaft 15 of a saw motor 16 by means of a suitable coupling means 17. The saw blade 14 and motor 16 are mounted to a double pivot type of lever arm assembly 20 such that the blade can be moved transversely (into and out of the plane of the drawing of FIG. 1) to cut boards fed into the saw. The lever arm assembly 20 is of a conventional double pivot type which allows a straight line cut by the blade such that, as the blade moves transversely across the work piece it will not raise or lower. The assembly 20 including the attached saw, motor and blade is hydraulically operated by means of electrically operated hydraulic valves as described below.

A feed conveyor 22 is mounted adjacent the saw table 12 at approximately the same height and has a conveyor belt 24 which moves around rollers 26 and 28 respectively at either end of the conveyor. The conveyor belt 24 is driven by an electrical motor 30 having a shaft 31 coupled to an electrically operated brake-clutch unit 32. An output shaft 33 of the brake-clutch unit 32 is coupled to a gear reduction box 34 having an output shaft coupled to conveyor roller 26 by means of a drive belt 36. The rotary motion of the output shaft of the gear reduction box 34 is also coupled to an output conveyor 40 by means of a drive belt 38 coupled to a roller 42 on which the conveyor belt 44 is mounted in connection with an end roller 46. Thus in the arrangement shown in FIG. 1, both the feed conveyor 22 and the output conveyor 40 are driven by the single motor 30 by operating the brake-clutch unit 32. Both of these conveyors are mounted in a horizontal plane at the same height as the table 12 by end legs 48 and 49 on the feed conveyor 22 and output conveyor 44 respectively, and by attachment to table 12.

The feed and output conveyors include rear guide plates 50 and 52 respectively against which a board 54 is placed during the operation of the defecting saw. The feed conveyor 22 further includes a pair of arms 56 and 58 extending outwardly (FIG. 2) to receive boards to be placed on the moving belt 24 of the feed conveyor 22 once defects on the boards are marked. A pinch roller unit 60 includes a lever arm 62 pivotally mounted to the unit and spring loaded such that a roller 64 at one end of the lever arm 62 will contact and hold down a board as it is fed into the saw blade area. The pinch roller unit 60 includes an adjustment 65 for varying the spring loading force as necessary with different size boards.

The defecting saw includes a detection unit 70 having a light source 74 mounted in a surrounding case 75 which is mounted to the right of the saw blade 14. Adjacent the light source 74 is an optical detection unit 76 comprising a photo transistor in the preferred embodiment. In some embodiments a photo cell may be employed. The photo transistor has a built-in conveying line (not shown) and includes a shield 78 to prevent direct light from light source 74 from impinging upon the photo sensitive surface of the photo transistor 76. The detection unit 70 is electrically coupled to a control box 80 which includes the necessary control circuits for automatically operating the saw and feed conveyor.

Figure 4:
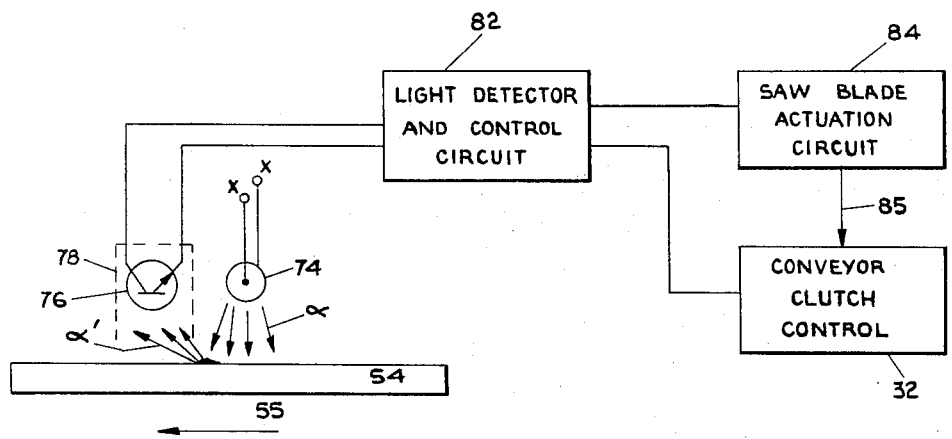
FIG. 4 is a diagram, partially in pictoral and block form showing the optical detection means and control circuit employed with the saw to actuate the feed conveyor and saw blade.

FIG. 4 illustrates the operation of this saw and shows the operation of the light source 74, which is a filtered fluorescent long wave ultra-violet source (black light) available from the Edmund Scientific Company, in conjunction with the photo-transistor 76 and the control circuits. The photo-transistor 76 is surrounded by a shield 78 to prevent direct light from the lamp 74 from inpinging upon the photo-transistor 76. Thus, only light from the area below the photo-transistor (i.e., from the board 54) will be detected thereby. The light source 74 is activated by connecting terminals X X in the figure to a suitable power source.

Figure 2:
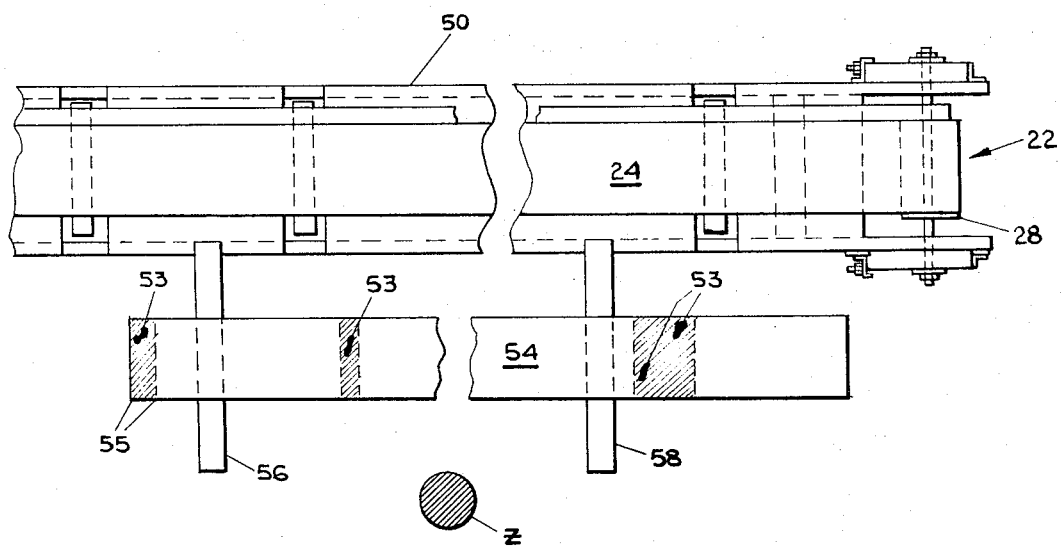
FIG. 2 is a plan view of a portion of the saw shown in FIG. 1 taken along the lines II—II in FIG. 1.

In operation, the workman employing the defecting saw to cut away defects stands at an operator station Z (FIG. 2) and rests boards 54 on the outwardly extending arms 56, 58. He visually inspects the board for defects 53 which he marks with fluorescent chalk marks 55 at either edge of the defects as shown in FIG. 2. The chalk is selected for fluorescent efficiency and an emission wavelength suitable for the optical detection means 76 employed. Suitable chalk is commercially available from the Oliver Machinery Co., Grand Rapids, Michigan. The board 54 is then slid against the rear guide plate 50 of the feed conveyor 22 whereby it is fed into the saw 10 by the moving belt 24. The pinch roller unit 60 holds the board securely in place as it approaches the saw. Once in the area under the light 74 (FIGS. 1 and 4) light rays $\alpha$ from the light 74 excite the fluorescent chalk mark 55 such that they are illuminated and emit visible light rays $\alpha'$ which can be detected by the photo-transistor 76. It is noted here that only the fluorescent chalk will emit detectable light rays $\alpha'$ since the frequency of the excitation source 74 matches that of the marks 55. Other portions of the board will not give off a sufficient amount of light to effect the operation of the saw.

Figure 3:
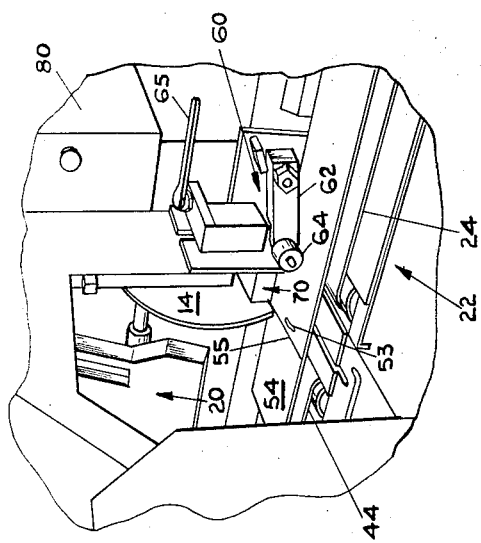
FIG. 3 is a perspective view of the defecting saw in operation.

The photo-transistor 76 is coupled to a light detector and control circuit 82 which includes a commercially available unit type TRB with a 2443 relay coupled in combination with a type TR4-3 module; available from the Farmer Electric Company in Massachusetts. When light from a mark 55 on board 54 strikes the photo-transistor 76, the control circuit 82 provides an electrical control signal to the saw blade actuation circuit 84. Circuit 84 includes an electrically operated hydraulic valve such that the double pivot arm assembly 20 will swing the rotating saw blade across the board 54 as shown in FIG. 3. At substantially the same time, another control signal also developed by circuit 82 is applied to the electrically actuated conveyor clutch control 32. Thus when light from a fluorescent mark 55 excited by the black light 74 is detected by photo-transistor 76; the feed and output conveyors are stopped and the board 54 is held in place on table 12 by the pinch roller 60 such that the saw blade can swing out to cut the board at the marked position. As the pivot arm assembly automatically returns to the rearward position, a second control signal is developed by circuit 84 and is applied to the clutch control circuit 32 by means of conductor 85 to restart the feed and output conveyors. As another mark 55 enters the sawblade area and is detected by the detector unit 70, the cycle will be repeated.

It is noted that the saw includes adjustments to control the swath cut by the sawblade as well as the speed at which the pivot arm assembly 20 swings the blade 14 across a board. In one embodiment, a housing surrounds the sawblade area to which a suction type cleaner is attached. The cleaner operates to draw sawdust away from the saw area and maintain the optical paths for the detector circuit clear.

Circuit 84 includes conventional control circuits which may include, for example, limit switches mechanically coupled to the pivot arm assembly to develop the second control signal applied the circuit 32 when the pivot arm assembly 20 returns to the rest position after a cut is made. Although the invention is described in the environment of a defecting saw, it could be used in any automatic saw installation where for example preselected board lengths could be automatically cut be marking the boards with optically detectable marks at desired intervals.

The embodiments of the invention in which an exclusive property or privilege is claimed are defined as follows.

1. A defecting saw and control system therefor for automatically cutting defects from boards or the like, said system comprising:
   conveying means for feeding boards to the defecting saw,
   a saw element including means for moving said saw element across the path of travel of boards transported by said conveying means,
   a source of illumination positioned adjacent said saw element,
   means for applying marks defining the bounderies of a defect in a board, said means comprising material responsive to light from said source when a marked board is fed to said saw to emit visible frequency light of sufficient intensity to permit detection of such visible mark during the operation of the saw and in the presence of sawdust,
   means positioned adjacent said source of illumination for detecting light emitted by an illuminated mark on a board fed into said saw, and
   control means coupled to said detecting means and responsive to signals therefrom to actuate said saw element to cut a board at a detected mark.

2. The system as defined in claim 1 wherein said applying means comprises a fluorescent material response to light from said source to fluoresce and emit visible frequency light.

3. The system as defined in claim 2 wherein said source is a source of ultraviolet frequency radiation.

4. The system as defined in claim 1 wherein said applying means comprises fluorescent chalk.

5. The system as defined in claim 1 wherein said conveying means comprises a motor driven conveyor and clutch means coupled to said conveyor and to said control means for stopping said conveyor and the feeding of a board into the saw when a mark is detected and for subsequently advancing said board after the saw has cut said board at said mark.

6. The system as defined in claim 1 wherein said detecting means comprises a photosensitive device responsive to visible frequency light from an illuminated mark to develop a control signal.

* * * * *